Nov. 6, 1956   T. J. BLOSICK   2,769,613
WIRE STRETCHER
Filed Jan. 13, 1954
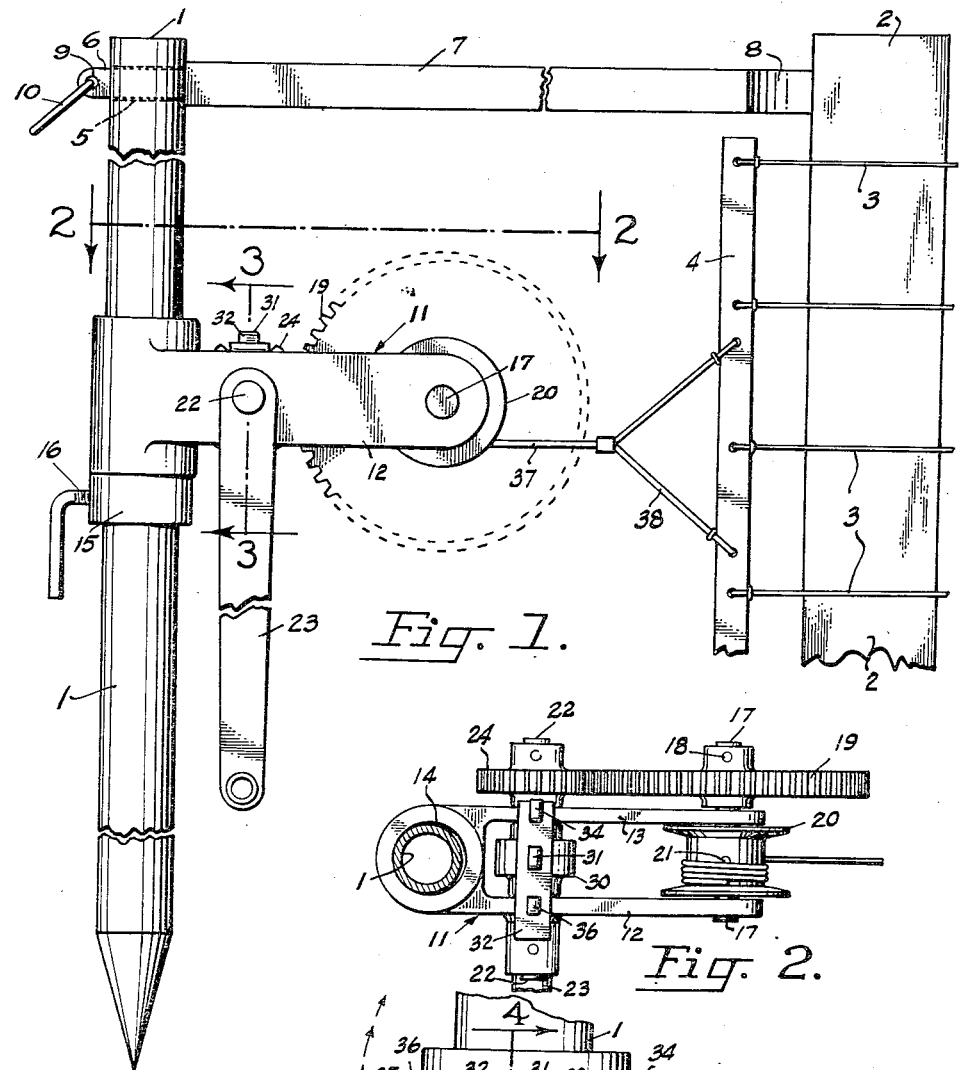
Fig. 1.
Fig. 2.
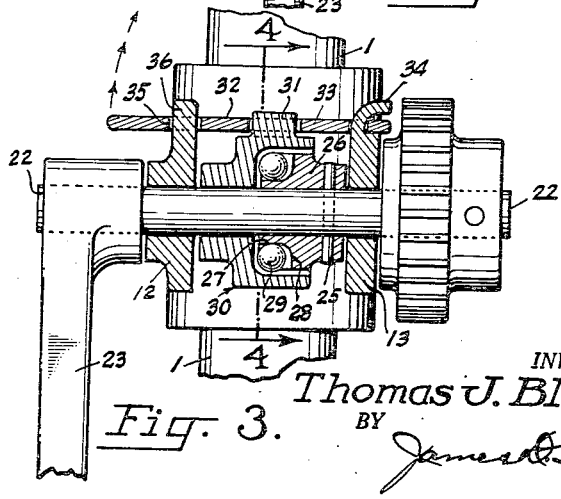
Fig. 4.
Fig. 3.
INVENTOR.
Thomas J. Blosick
BY
Atty.

2,769,613

WIRE STRETCHER

Thomas J. Blosick, Beaverton, Oreg.

Application January 13, 1954, Serial No. 403,694

1 Claim. (Cl. 254—163)

This invention relates to new and useful improvements in wire stretchers.

One object of the invention is to provide a device of this character which is of simple and durable construction and which is positive and efficient in operation.

A further object is to provide a novel mechanism for locking the winding mechanism against retrograde movement when under tension instantaneously upon release of the winding crank.

The foregoing and other objects will appear as my invention is more fully hereinafter described in the following specification, illustrated in the accompanying drawings, and finally pointed out in the appended claim.

In the accompanying drawing:

Figure 1 is a side view of a wire stretcher made in accordance with my invention and shown in an operative position.

Figure 2 is a sectional top plan view taken along the line 2—2 of Figure 1.

Figure 3 is an enlarged sectional view taken along the line 3—3 of Figure 1.

Figure 4 is a sectional detail view taken along the line 4—4 of Figure 3.

Referring now more particularly to the drawing:

In Figure 1 reference numeral 1 indicates a stake or other suitable upright adapted to be driven into the ground in spaced alignment with a fence post 2 and the end of wire mesh or wires 3 to be stretched after their attachment to a spacer bar indicated at 4. A single strand of wire to be stretched would, of course, be connected directly to the winding mechanism.

An opening 5 is formed in the upper end of the upright 1 to receive the reduced end 6 of a cross brace 7 whose opposite end is sharpened as at 8 and thereby adapted to be driven into the fence post. The end 6 of the brace extends through the stake as shown and is apertured as at 9 to receive a ring 10 for attachment to a guy wire not shown or the end of the guy wire could be looped through the aperture if desired.

The main body of the wire stretcher is in the form of a yoke generally indicated at 11 and having two parallel arm portions 12 and 13 and being bored vertically as at 14 at one of its ends for operative attachment to the upright 1 and for vertical adjustment with respect thereto by means of a collar 15 lockable to the upright in any desired position by means of a locking bolt 16.

A driven shaft 17 is journaled through the outer ends of the shafts 12 and 13 and to one of its ends is secured as at 18 a driven gear 19. A winding drum 20 is secured as at 21 to the shaft between the arms 12—13. A drive shaft 22 is journaled through the arms 12—13 near their inner or opposite ends and provided at one of its ends with a crank arm 23 and at its opposite end with a driving gear 24 at all times in mesh with the driven gear 19. Disposed between the arms and secured to the drive shaft by means of a pin 25 is one element 26 of an overrunning clutch having external cam surfaces 27 extending tangentially from diametrically opposed pockets within which ball elements 29 are operatively disposed. The companion clutch element is in the form of a housing 30 mounted on the drive shaft 22 by a working fit and internally bored as at 30A. A radial projection 31 is formed integral with the housing 30 and adapted for selective engagement with a locking bar 32 through the medium of an opening 33 formed in the bar. The locking bar is swingably attached at one of its ends to an outwardly curved projection 34 formed integral with the arm 13 of the yoke and engageable at its opposite end by means of an opening 35 formed therein with a vertical projection 36 formed integral with the other arm 12 of the yoke.

In setting up the device into an operative position the upright 1 is driven into the ground at the proper distance from the fence post and in line with the fence, with one end of the brace in the opening at the upper end of the upright and with its other end driven into the post. The use of a guy wire is optional. A single wire to be stretched or the wire 37 attached through the media of a bridle 38 and the spacer bar 4 to the multiple wires or mesh 3 is passed through an opening in the winding drum 20 and properly secured against unintentional withdrawal. The counter-clockwise rotation of the crank arm 23 by an operator will cause the wire to wind about the drum. The rotation of the drive shaft in a corresponding direction will allow the ball elements 29 to roll freely within their respective pockets 28 out of effective contact with the annular wall of the bore 30A in the housing element 30 which is held in a fixed position by a locking bar 32 as aforesaid. This freedom of movement of the clutch element continues as long as the wire is being wound about the winding drum. The tension of the wire being stretched will, of course, tend to impart retrograde movement to the gears 19 and 24 but such movement will be prevented, immediately upon release of the crank arm, by the instantaneous engagement of the ball elements with the annular wall of the bore 30A within the housing 30 which is securely locked to the arms of the yoke by the locking bar 32, as aforesaid.

Upon swinging the locking bar upwardly in the direction of the arrows applied to it in Figure 3 the drum may be freely rotated to unwind the wire from it or for any other purpose.

While I have shown a particular form of embodiment of my invention I am aware that many minor changes therein will readily suggest themselves to others skilled in the art without departing from the spirit and scope of the invention. Having thus described my invention what I claim as new and desire to protect by Letters Patent is:

A stretching device comprising a yoke adapted for adjustable mounting on a support, said yoke including a pair of spaced apart parallel arms, a driven shaft rotatably extending transversely through the arms, a winding drum mounted on the shaft between the arms, a driven gear secured to said shaft, a drive shaft rotatably mounted through the arms and spaced apart from and disposed parallel with the driven shaft, a driving gear secured to the drive shaft and meshed with the driven gear, operating means secured to the drive shaft, a two-part unidirectional clutch carried by the drive shaft between said arms, one of said clutch parts being fixedly circumposed on the drive shaft for rotation therewith, the other of said clutch parts being rotatably circumposed on the drive shaft alongside the first part, a locking member carried by the arms and positioned across said arms adjacent said other clutch part, interconnecting means between said other clutch part and the locking member for holding the other clutch part against rotation and locking it to the arms, said interconnecting means including a tongue on the other clutch parts fitted in a slot in the locking member, means mounting said locking member on the arms for releasable fixed relationship therewith, said mounting means for the locking member including a hinged connection between one end of the locking member and one of the arms so that the locking member is swingable away from the clutch to disengage said interconnecting means and a tongue on the other of the arms fitting in a slot in the other end of the locking member for locking the member in relation to the clutch so that the interconnecting means is operative, said other clutch part being internally bored and embracing said one part, said one part having a plurality of pockets formed in its peripheral surface and cam surfaces extending tangentially from said pockets, ball elements disposed in said pockets and operable by the cam surfaces into engagement with said internal bore of the other of said clutch parts to lock said one part and the shaft against retrograde movement.

References Cited in the file of this patent

UNITED STATES PATENTS

| | | |
|---|---|---|
| 140,421 | Knowles | July 1, 1873 |
| 353,383 | Sherman | Nov. 30, 1886 |
| 1,558,582 | Blosick | Oct. 27, 1925 |
| 2,604,273 | Hayes | July 22, 1952 |